United States Patent [19]

Barnes

[11] 4,396,328

[45] Aug. 2, 1983

[54] COUPLING PIN

[76] Inventor: David A. Barnes, Rte. 3, Box 18, Troup, Tex. 75789

[21] Appl. No.: 182,817

[22] Filed: Aug. 29, 1980

[51] Int. Cl.$^3$ ............................................. F16B 21/18
[52] U.S. Cl. .................................. 411/353; 411/211; 411/479; 411/520
[58] Field of Search .............. 411/337, 340, 341, 342, 411/343, 344, 345, 346, 349, 351, 353, 477, 478, 479, 513, 517, 520, 209, 210, 211, 212, 213

[56] References Cited

U.S. PATENT DOCUMENTS

| | | |
|---|---|---|
| 136,757 | 3/1873 | Oliver . |
| 634,522 | 10/1899 | Daly ..................................... 411/478 |
| 639,337 | 12/1899 | Anthony ......................... 411/513 X |
| 1,270,059 | 6/1918 | Schaefer . |
| 1,542,493 | 6/1925 | Coleman ............................ 411/340 |
| 1,542,727 | 6/1925 | Regan et al. .................... 411/351 X |
| 1,752,544 | 4/1930 | Sparrow . |
| 2,559,737 | 7/1951 | Schaefer .............................. 411/513 |
| 2,972,275 | 2/1961 | Baubles .............................. 411/479 |
| 3,077,810 | 2/1963 | Heidbrink ........................... 411/340 |
| 3,132,556 | 5/1964 | Doering et al. .................... 411/340 |
| 3,383,972 | 5/1968 | Jackson et al. .................... 411/340 |
| 3,428,344 | 2/1969 | Strange ........................... 411/353 X |
| 3,433,118 | 3/1969 | Ward .................................. 411/340 |
| 3,658,369 | 4/1972 | Barnes . |
| 3,926,089 | 12/1975 | Ruebil et al. ........................ 411/340 |
| 4,031,802 | 6/1977 | Hallock ........................... 411/479 X |
| 4,036,097 | 7/1977 | Greenwood ........................ 411/340 |
| 4,037,513 | 7/1977 | Hobson .............................. 411/513 |
| 4,142,704 | 3/1979 | Murray ........................... 411/353 X |

FOREIGN PATENT DOCUMENTS

| | | | |
|---|---|---|---|
| 218550 | 4/1909 | Fed. Rep. of Germany ...... 411/340 |
| 2819624 | 11/1979 | Fed. Rep. of Germany ...... 411/340 |
| 378746 | of 1907 | France ............................... 411/513 |
| 487623 | 4/1918 | France ............................... 411/513 |
| 706061 | 3/1954 | United Kingdom . |
| 730898 | 6/1955 | United Kingdom . |
| 1008808 | 11/1965 | United Kingdom . |
| 1032307 | 6/1966 | United Kingdom . |
| 1077171 | 7/1967 | United Kingdom . |
| 1164060 | 9/1969 | United Kingdom . |
| 1191194 | 5/1970 | United Kingdom . |
| 1214241 | 12/1970 | United Kingdom . |
| 1430549 | 3/1976 | United Kingdom . |

Primary Examiner—Thomas J. Holko
Attorney, Agent, or Firm—Hubbard, Thurman, Turner & Tucker

[57] ABSTRACT

A coupling pin for agricultural implement hitches and other mechanical couplings includes an elongated generally cylindrical body portion and a ring-like retainer portion integrally formed with the body portion. The coupling pin is formed from spring steel plate or the like by a shearing or blanking operation and successive bending operations to form the pin body from opposed overlapping or abutting blade portions. The ring-like retainer portion which is concomitantly formed with the pin body has opposed sides drawn to shorten the retainer to provide engagement of a recessed portion formed on the retainer with the distal end of the pin body.

17 Claims, 12 Drawing Figures

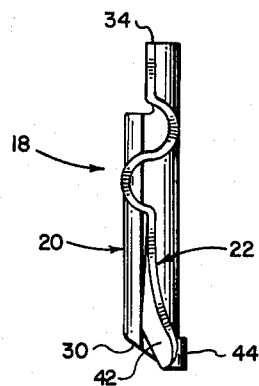
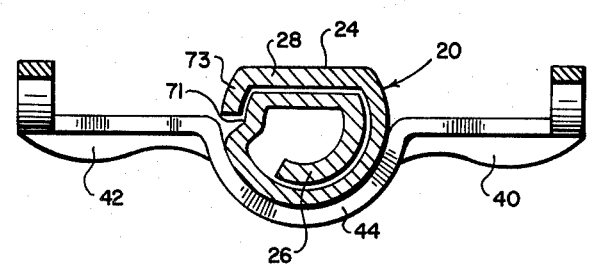
FIG. 7  FIG. 8
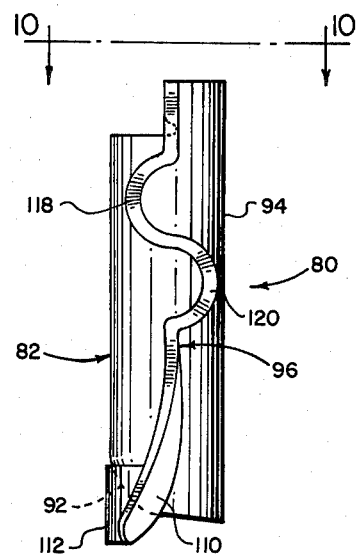
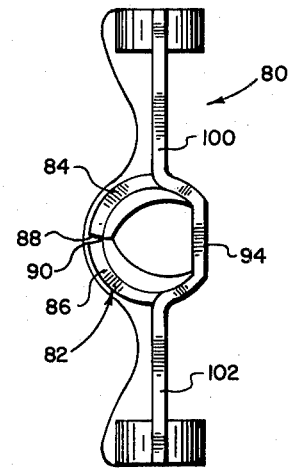
FIG. 9  FIG. 10
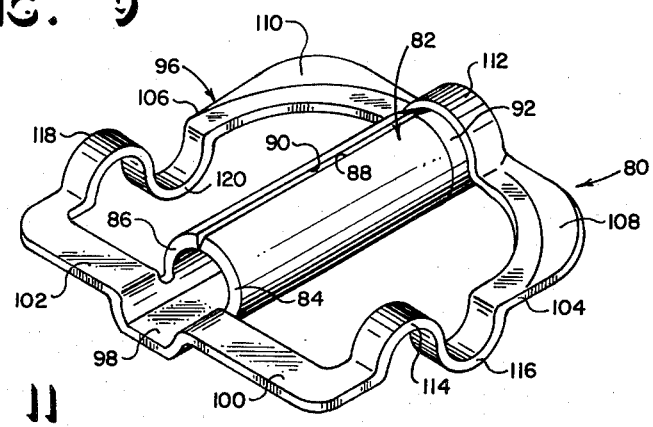
FIG. 11

COUPLING PIN

BACKGROUND OF THE INVENTION

1. Field of the Invention

This invention pertains to removable coupling pins for use in retaining two or more machine elements in coupled relationship. In particular the coupling pins of the present invention are adapted for use with agricultural implement hitch assemblies and the like.

2. Description of the Prior Art

In implement hitch assemblies and other mechanical couplings it is common practice to provide a cylindrical pin or shaft for forming a connection between two elements. It is customary in such mechanical couplings to provide a pin or like member which is insertable in a hole in the end of the coupling shaft to prevent separation of the connected coupling members. For example, in agricultural implement hitches one or more transversely oriented shafts are provided which form a pivotal connection or coupling between an implement and the tractor draw bar linkage. The shaft is retained in connection with the tractor hitch link arm by a removable pin which is usually provided with some form of retainer to prevent unwanted ejection of the pin from a transverse hole in the end of the shaft, which ejection would result in separation of the implement or other towed vehicle from the tractor.

A number of inventions have been developed in an effort to provide a coupling pin which is strong enough to resist breaking or bending due to loads imposed thereon by the coupled hitch linkages, which is easily inserted and removed by the machine operator, but which also is provided with suitable retaining means to prevent unwanted ejection or removal. Prior art coupling pins have been provided which include a solid shank or body component and a separate retainer ring connected to the body in a number of ways. One shortcoming of prior art coupling pins has been the difficulty in providing a pin retainer which is suitably operable to prevent unwanted removal of the pin from the hitch assembly but which is also easily moved by the machine operator to provide for insertion and removal of the coupling pin at will. For example, some prior art coupling pins have retainers which are difficult to grasp and operate with a gloved hand or by a person with poor dexterity caused by previous injury or inflammation of the joints and tendons.

Furthermore, prior art coupling pins have been somewhat expensive to manufacture, and since the nature of the use of such pins results in their frequent loss and replacement it is also desirable to provide a pin which is economical and which meets substantially all of the desiderata of use and operability.

SUMMARY OF THE INVENTION

The present invention provides an improved coupling pin for machine couplings of a type which is insertable in a transverse opening in a coupling shaft or the like for retaining at least two elements in coupled relationship.

The present invention is characterized by a coupling pin which is preferably made from metal plate which is suitably formed in a succession of metal forming operations into a substantially cylindrical pin body and having an integral retainer portion. In accordance with one embodiment of the present invention a blank of relatively light gauge steel plate is provided in which portions are bent or rolled into overlapping relationship to form a substantially cylindrical body or shank which is suitably resistant to bending or shearing.

In accordance with another embodiment of the present invention heavier gauge metal plate is used and the portions forming the pin body are bent or rolled into abutting relationship and do not overlap each other. In both embodiments of the present invention a substantially planar surface is formed along the length of the body to serve as an enlarged surface adapted to bear against the coupling element which is adjacent to the pin.

The present invention also provides a coupling pin which has an integral retainer ring portion which is formed to facilitate easy handling of the pin when inserting and removing the pin with respect to a coupling shaft, for example. In accordance with the preferred embodiments of the present invention the retainer portion of the pin is normally biased into its retaining position and is elastically deflectable out of the retaining position for insertion and removal of the pin with respect to the coupling shaft or other coupling member in connection with which the pin is to be used. The pin retainer is provided with surface portions which are easily engageable for elastically deflecting the retainer clear of the pin body to facilitate insertion and removal of the pin with respect to the coupling shaft. The pin retainer is also provided with a portion which is engageable with the pin body adjacent the distal end thereof to improve support for and prevent unwanted deflection of the retainer during use of the pin.

The present invention further contemplates an improved method of manufacturing a coupling pin having an integral retainer which is advantageously formed from a piece of metal plate, preferably spring steel, to have a number of desired features described hereinabove and in the detailed description which follows. In accordance with the improved method of manufacturing the coupling pin of the present invention a metal plate is formed in a succession of metal forming operations to provide a coupling pin comprising a substantially elongated cylindrical body or shank having an integral ring-like portion comprising a retainer. The retainer is formed to be symmetrical about the longitudinal central axis of the pin body, and is advantageously provided with integral torsion spring arm portions to provide for biasing the retainer into a position for retaining the pin in assembly with a coupling shaft or the like. The method of manufacturing a coupling pin in accordance with the present invention also provides enlarged surface portions on the pin retainer which facilitate easy digital movement of the retainer for insertion and removal operations. The method of manufacture of a coupling pin according to the present invention also provides for a pin body which includes a distal end portion which is tapered to further facilitate insertion of the pin in an opening in a coupling member.

The novel features of the present invention, the advantages provided thereby, and the objectives achieved will become apparent from reading the following detailed description in conjunction with the drawings.

BRIEF DESCRIPTION OF THE DRAWINGS

FIG. 7 is a side elevation of the coupling pin illustrated in FIG. 4;

FIG. 8 is a section view taken generally from the line 8—8 of FIG. 4;

FIG. 9 is a side elevation of an alternate embodiment of a coupling pin in accordance with the present invention;

FIG. 10 is an end view taken from the line 10—10 of FIG. 9;

FIG. 11 is a perspective view of the embodiment shown in FIGS. 9 and 10; and

DESCRIPTION OF THE PREFERRED EMBODIMENTS

Figure 1:
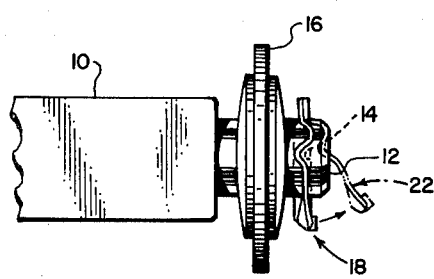
FIG. 1 is a side elevation of a portion of a coupling structure such as a tractor-implement hitch arrangement showing the coupling pin of the present invention employed therewith.
Figure 2:
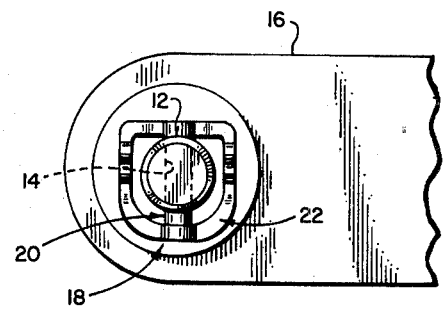
FIG. 2 is an end view of the coupling shown in FIG. 1.

Referring to the drawings, the respective views are in different scales to better illustrate certain features of the invention. Referring to FIGS. 1 and 2 in particular, the coupling pin of the present invention is illustrated as applied for retaining an agricultural implement coupled to the hitch mechanism or draw bar of a tractor or the like. However, the present invention is not limited to the specific application shown and may be used in conjunction with a wide variety of mechanical couplings.

In FIG. 1 an implement coupling member 10, shown fragmentarily, includes a shaft portion 12 having a transverse aperture or hole 14 therethrough and adjacent to the distal end of the shaft. A tractor hitch member 16, having an opening therethrough is disposed over the shaft 12 so that the aperture 14 is outboard of the member 16 with respect to the shaft 12. In regard to implement hitches it will be appreciated that the opposite end of the implement coupling member 10 is provided with a shaft portion similar to the shaft portion 12 for receiving a tractor hitch member similar to the member 16 forming a well known type of hitch or coupling.

The member 16 is retained on the shaft 12 by an improved coupling pin, generally designated by the numeral 18. The coupling pin 18 includes a body portion 20, FIG. 2, disposed in the hole 14 and an integral end retainer portion 22 which is disposed around or substantially encircles the shaft 12 to prevent unwanted ejection of the pin from the hole. Accordingly, the coupling pin 18 prevents any lateral excursion of the member 16 off of the end of the shaft 12 which would result in disengagement from the member 10.

A particularly superior feature of the present invention resides in the provision of a coupling pin which is formed in its entirety from a substantially flat piece of metal plate, preferably a suitable grade of spring steel or the like. Referring now to FIG. 4 of the drawings the pin 18 is illustrated with the side facing upward which is adapted to be facing the coupling member such as the member 16 which is to be retained in assembly with a second coupling member, such as the member 10. As will be appreciated from viewing FIGS. 3 and 4 the pin body 20 is provided as an elongated generally cylindrical member having a substantially flattened or planar surface portion 24 forming an enlarged bearing surface for abutting the member 16, for example, to provide uniform engagement of the member with the pin body to distribute the forces exerted on the pin.

Figure 3:
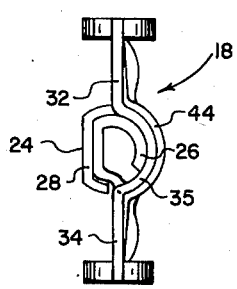
FIG. 3 is an end view of the coupling pin of the present invention.
Figure 4:
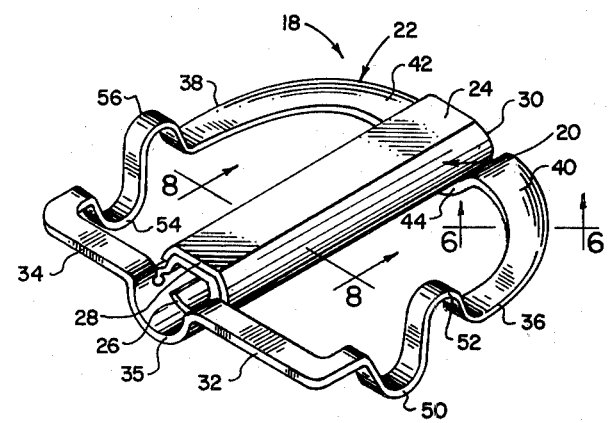
FIG. 4 is a perspective view of the coupling pin shown in FIGS. 1 through 3.

The body 20 is advantageously formed by opposed blade portions 26 and 28 which are suitably rolled one within the other to substantially overlap one another as shown in FIGS. 3 and 4.

Referring also to FIG. 7, the distal end 30 of the pin body 20 is somewhat tapered, as shown, which facilitates insertion of the pin in the associated hole or aperture provided in the coupling member such as the hole 14 in the shaft 12. The tapered end portion 30 is provided in a unique way thanks to the improved manner in which the pin 18 and particularly the pin body 20 is formed as will be explained further herein.

Figure 6:
FIG. 6 is a section view taken from the line 6—6 of FIG. 4.

Referring again to FIG. 4 the retainer 22 is formed as a generally ringlike portion having opposed transversely extending arms 32 and 34 which extend from an integral head portion 35 of the pin body 20. The arms 32 and 34 are, respectively, integrally formed with longitudinally extending leg portions 36 and 38. The leg portions 36 and 38 blend into a part of the retainer which includes opposed enlarged surfaces or pads 40 and 42 adapted to be digitally engaged to elastically deflect the retainer 22 so that the pin may be inserted or removed from a coupling member such as the shaft 12. As shown by way of example in FIG. 6 the pads 40 and 42 are curved away from the central longitudinal axis of the pin body 20 in the direction which the retainer is to be deflected during insertion and removal operations of the pin body. The part forming the surfaces 40 and 42 also includes a curved recess portion 44 which is interposed between the surfaces 40 and 42 and which lies adjacent to and preferably is biased against the distal end 30 of the pin body as shown in FIGS. 3, 4 and 7.

Accordingly, the retainer 22 is operable in its normally biased position to engage the distal end 30 of the pin body to prevent accidental ejection of the pin from the associated coupling member. However, the part of the retainer 22 including the recess portion 44 is also easily manually deflected away from the body 20 to provide for insertion and removal of the pin with respect to the associated coupling member such as the shaft 12 shown in FIGS. 1 and 2. In fact, one of the major advantages of the present invention is the ease with which the retainer 22 may be manipulated to be deflected away from the distal end of the pin body 20, for example, by engaging the surfaces 40 and 42 with the tips of adjacent fingers while using the thumb to bear against the body when the retainer is to be deflected upon insertion of the pin into the aperture in the coupling member. Moreover, no squeezing or other difficult dexterous movements must be made to deflect the retainer 22 when removing the pin from its associated coupling member such as the shaft 12. The surfaces 40 and 42 may be easily engaged by the ends of adjacent fingers to deflect the retainer away from the pin body and at the same time exerting a longitudinal force to remove the pin from its aperture. The provision of the surfaces 40 and 42 and the general arrangement of the retainer 22 also provide for easy engagement of the retainer by a gloved or mittened hand or by persons with diminished digital dexterity.

In accordance with a preferred form of manufacturing the coupling pin of the present invention, and in order to desirably maintain the leg portions 36 and 38 of the ring-like retainer substantially parallel to each other, the arms 32 and 34 must be drawn toward each other to compensate for the displacement of material caused by the formation of the recess 44. Accordingly, as shown in the drawings the head 35 is also formed as a curved portion which provides for suitable displacement of material forming the head portion and the arms 32 and 34 thereby drawing the leg portions 36 and 38 toward each other at one end an amount equal to the same extent that the leg portions are drawn toward other as caused by the formation of the recess 44.

Further in accordance with a preferred method of making the coupling pin of the present invention the leg portions 36 and 38 are shortened by formation of opposed bends 50 and 52, and 54 and 56, respectively, in order to draw the part of the retainer 22 adjacent to the distal end 30 of the pin body sufficiently to provide for engagement of the recess 44 with the distal end. Two bends are formed in each leg to minimize the depth of draw in the forming dies and to provide for displacement of the desired amount of material without forming a bend that would extend too far laterally so as to represent a potential hazard in the use of the pin. A large single bend in each leg might, for example, allow an object to catch the retainer and damage it or, although unlikely, cause accidental displacement of the pin from its associated coupling member.

Figure 5:
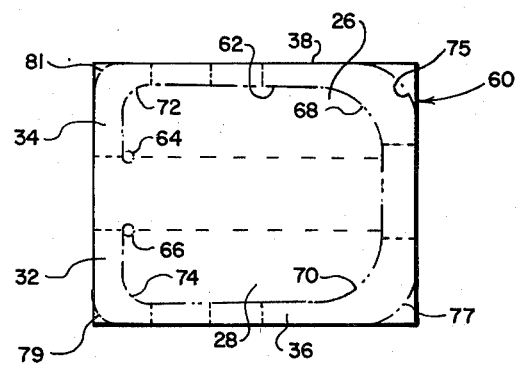
FIG. 5 is a plan view of a piece of metal plate forming a blank from which the coupling pin illustrated in FIG. 4 may be fabricated and illustrating generally the cut and bend lines.

Referring to FIG. 5, the coupling pin 18 is preferably formed from a suitable blank of spring steel sheet or plate designated by the numeral 60. For the embodiment of the invention shown in FIGS. 1 through 8 of the drawings it is contemplated that spring steel sheet of a thickness in the range of 20 gauge to 26 gauge (U.S. Standard Sheet Metal) would be a suitable thickness. The blank 60 may be integral with a series of other blanks during a successive number of forming operations but is shown as a unitary piece to simplify the illustration thereof. In the drawing FIG. 5 the line 62 represented by alternate long and short dashes denotes where the material is cut or sheared, and the continuous short dashed lines denote relatively sharp bend lines. The line 62 forms a major portion of a loop but terminates at opposite ends in substantially circular holes 64 and 66 as shown in FIG. 5.

In accordance with a preferred method of making the pin 18 the blank 60 is initially struck to form a cut in the material the entire length of the line 62 from the hole 64 to the hole 66. The cut line 62 includes curved portions 68 and 70 of relatively large radii and curved portions 72 and 74 of smaller radii. The holes 64 and 66, which are formed to prevent tearing of the pin material at the junction of the body head 35 and the blade portions 26 and 28, respectively, may be punched when the blank 60 is struck to cut the material along the line 62 to form the blades 26 and 28 and partially bend the blades at the same time. If the pin is being formed from a single blank such as the blank 60 the corners 75, 77, 79, and 81 would also be cut or sheared when the cut 62 is made although such an operation to form the corners could be performed later. In second and third bending operations the blades 26 and 28 may be progressively rolled into overlapping relationship as shown in FIGS. 3, 4 and 8. As shown in FIG. 8, the blade 26 is also struck to form a longitudinal indentation 71 which provides for nesting of the distal portion 73 of the blade 28 as it is relatively sharply bent away from the surface 24 as shown. As the blades 26 and 28 are progressively rolled and bent the recesses 35 and 44 are simultaneously formed in a progressive manner in, for example, the second through the fourth striking or bending operations. Concomitantly the surfaces 40 and 42 are bent to form the curved portions shown.

Finally, in a fifth or last operation the opposite bends 50, 52, 54 and 56 are formed to draw the part of the retainer 22 including the recess 44 adjacent to the distal end 30 of the pin body. Thanks to the generously curved portions 68 and 70 of the cut line 62 the body 20 is provided with the tapered portion on the distal end 30 to facilitate insertion of the pin into its intended aperture such as the hole 14 in the shaft 12.

In accordance with the abovedescribed method there is provided a coupling pin having a number of superior features as pointed out in the foregoing description. In the coupling pin 18 the elastic deflection of the retainer 22 away from the body 20 takes place almost entirely by longitudinal twisting of the arms 32 and 34. However, if the retainer 22 were of a more rounded or oval shape the deflection would be spread over the side portions of the ring-like retainer, described in the embodiment of FIGS. 1 through 8 as the legs 36 and 38.

An alternate embodiment of the present invention is illustrated in FIGS. 9, 10 and 11 of the drawings and is generally designated by the numeral 80. The coupling pin 80 is adapted to be formed of heavier gauge spring steel plate such as, for example, number 16 gauge (U.S. Standard Sheet Metal) for larger diameter pins. The coupling pin 80 has a body 82 which is formed of opposed integral blade portions 84 and 86 which, due to the material thickness, are bent into abutting relationship along their respective longitudinal edges 88 and 90 instead of being substantially overlapped as in the coupling pin 18. The distal end 92 of the pin body 82 is tapered due to the curved portions of the blades 84 and 86 which are formed substantially in the same manner as the blade portions of the pin body 20 in the embodiment shown in FIGS. 1 through 8. The pin body 82 is also provided with a flat surface portion 94 forming a bearing surface.

The coupling pin 80 also includes a generally ring-like retainer 96 integrally joined to the body 82 at a head portion 98. The retainer 96 is provided with oppositely extending arms 100 and 102 and respective leg portions 104 and 106. The leg portions 104 and 106, respectively blend into enlarged surfaces 108 and 110 and which are curved upwardly away from the pin body 82 in the direction of deflection of the retainer for purposes of insertion and removal of the pin with respect to an associated coupling member. A curved recess portion 112 is also formed in the ring-like retainer between the surfaces 108 and 110 and is adapted to lie closely adjacent to the distal end 92 of the body 82. The head portion 98 is also formed to be recessed in the opposite direction with respect to the displacement of material to form the recess 112. The formation of the flat surface portion 94 of the pin body, as shown, and the recessed head portion 98 is preferred in the manner shown is preferred in the embodiment of FIGS. 9 through 11 due to the material thickness being somewhat greater than that used for the embodiment of FIGS. 1 through 8. The coupling pin 80 also includes double bends 114 and 116 on the leg portion 104 and bends 118 and 120 on the leg portion 106 for the same purpose as described above for the coupling pin 18.

In a preferred method of making the coupling pin 80 the steps generally described above for the manufacture of the coupling pin 18 would be followed without, of course, requiring rolling or bending operations as extensive as are required for the pin body 20. However, in forming the pin 80 a blank similar to the blank 60 illustrated in FIG. 5 would be cut or sheared in an initial operation to form the blade portions 84 and 86 which would in successive bending operations be formed into the generally cylindrical pin body 82. The recessed head 98 and the recess 112 would be simultaneously formed in a drawing operation followed by the formation of the bends 114, 116, 118 and 120 in a further drawing operation to provide for placement of the recess 112 adjacent to the distal end of the pin body. In one or more of the intermediate forming operations the surfaces 108 and 110 would be formed with the curvature shown in the drawing figures.

It is contemplated that in certain applications of the coupling pins 18 and 80 that the respective pin bodies 20 and 82 might be strengthened by inserting a solid steel rod part or the like within the hollow interior of the respective bodies. The rod part could be dimensioned to be retained within the hollow interior of the respective bodies 20 and 82 by an interference fit or by a suitable staking operation to prevent unwanted removal of the rod part.

Figure 12:
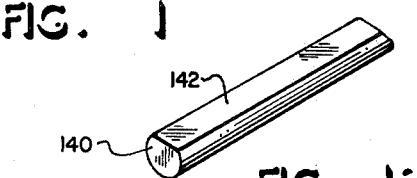
FIG. 12 is a perspective view of a solid rod insert part.

Referring to FIG. 12, by way of example, a solid steel rod part 140 is shown which is adapted to be disposed in the hollow interior of the body 20 of the pin 18. The solid rod part 140 is provided with a flattened side 142 to be contiguous with the flattened portion of the blade portion 26 when the rod is disposed within the body.

It will be appreciated from the foregoing description that an improved coupling pin is provided having a number of superior features and which is economical to manufacture in accordance with the method described. It will further be appreciated that variations in the constructions of the embodiments illustrated may be made by those skilled in the art without departing from the scope or spirit of the invention recited in the appended claims.

What I claim is:

1. A coupling pin having an elongated body including a distal end portion removably insertable in an aperture in a coupling element, and a retainer of said pin formed integral with said body and adapted to engage said element to prevent unwanted displacement of said body from said aperture, said retainer including a first part formed by a recess and adapted to be normally biased to lie adjacent to said distal end, said recess being interposed between enlarged surfaces on said retainer adapted to be digitally engaged to deflect said first part away from said distal end, and opposed portions of said retainer extending from a juncture with said body and forming a generally ring-like portion of said pin, and said pin includes a head forming said juncture and comprising a curved recess portion providing for displacement of material corresponding substantially to the amount of material displaced by the formation of said recess interposed between said enlarged surfaces.

2. The invention set forth in claim 1 wherein: said retainer is elastically deflectable to move said first part away from said distal end to permit insertion and removal of said pin with respect to said element.

3. The invention set forth in claim 1 wherein: said enlarged surfaces are each formed to have portions which are curved generally in the direction of deflection of said retainer.

4. The invention set forth in claim 1 wherein: said opposed portions include generally transverse arms each integrally formed with a respective leg portion which extends generally longitudinally with respect to said body, and said arms are adapted to be elastically twisted to provide for deflection of said retainer to permit insertion and removal of said pin with respect to said element.

5. The invention set forth in claim 4 wherein: said leg portions each include bends formed therein to provide for displacement of said retainer to place said first part adjacent to said distal end.

6. The invention set forth in claim 1 wherein: said pin is formed from a substantially flat plate having opposed blade portions bent toward each other to form an elongated generally cylindrical part comprising said body.

7. The invention set forth in claim 6 wherein: said body includes a longitudinally extending flattened portion forming a bearing surface.

8. The invention set forth in claim 6 wherein: said blade portions of said body are bent such that one blade portion substantially overlaps the other.

9. The invention set forth in claim 6 wherein: said blade portions are bent such that one blade portion is in abutting relationship with the other along respective longitudinal sides thereof.

10. The invention set forth in claim 6 wherein: said blade portions include opposed curved surfaces delimiting the distal end of said body and forming a taper of said distal end when said blade portions are bent toward each other to form said body.

11. The invention set forth in claim 6 together with: a substantially solid rod part adapted to be disposed within a hollow interior portion of said body formed by said blade portions.

12. A coupling pin including a body part and a generally ring-like retainer part integrally formed from a piece of metal plate, said pin being formed by cutting out an interior portion of said metal plate in such a way as to form opposed blade portions, which blade portions are bent toward each other to abut each other along respective longitudinal sides thereof to form an elongated generally cylindrical portion of said pin defining said body part, and a substantially elongated flat surface is formed on said body part between said blade portions to form a bearing surface engageable with a coupling element retained by said pin.

13. The invention set forth in claim 12 wherein: said blade portions abut each other along respective longitudinal sides thereof.

14. The invention set forth in claim 12 wherein: said retainer part includes a portion forming enlarged surfaces disposed remote from a juncture between said body part and said retainer part, said surfaces being adapted to be engaged to elastically deflect said retainer part away from said body part for inserting and removing said pin with respect to a coupling element.

15. The invention set forth in claim 12 wherein: said coupling pin is made from spring steel plate.

16. A coupling pin including a body part and a generally ring-like retainer part integrally formed from a piece of metal plate, said pin being formed by cutting out an interior portion of said metal plate in such a way as to form opposed blade portions, which blade portions are bent toward each other to form an elongated generally cylindrical portion of said pin defining said body part and wherein one of said blade portions is bent into a generally cylindrical shape with a substantially planar surface portion, and the other of said blade portions is bent into overlapping relationship with said one blade portion and includes a substantially planar surface lying adjacent said planar surface on said one blade portion.

17. A coupling pin including a body part and a ring-like retainer part integrally formed from a piece of metal plate, said pin being formed by cutting out an interior portion of said metal plate in such a way as to form opposed blade portions, which blade portions are bent toward each other to form an elongated generally cylindrical portion of said pin defining said body part, said pin including opposed portions of said retainer part which are displaced from the plane of said metal plate to draw a further portion of said retainer part closely adjacent to a distal end of said body part, said further portion of said retainer part includes a curved recess partially enclosing said distal end of said body part, and said pin including a curved recess formed at a juncture of said retainer part and said body part and providing for displacement of said metal plate from said plane substantially the same amount as provided by the displacement of said further portion of said retainer part.

* * * * *